United States Patent [19]

Kira

[11] Patent Number: 5,153,980
[45] Date of Patent: Oct. 13, 1992

[54] METHOD OF FORMING A MAGNETIC HEAD CHIP FOR A THIN FILM MAGNETIC HEAD

[75] Inventor: Tohru Kira, Tenri, Japan

[73] Assignee: Sharp Kabushiki Kaisha, Osaka, Japan

[21] Appl. No.: 736,386

[22] Filed: Jul. 26, 1991

Related U.S. Application Data

[62] Division of Ser. No. 368.265, Jun. 19, 1989, Pat. No. 5,068,760.

[30] Foreign Application Priority Data

Jun. 23, 1988 [JP] Japan .............................. 63-157268

[51] Int. Cl.⁵ .............................................. G11B 5/42
[52] U.S. Cl. ..................................... 29/603; 360/121
[58] Field of Search ............... 29/603; 360/110, 121, 360/122, 125, 126

[56] References Cited

U.S. PATENT DOCUMENTS

| | | | |
|---|---|---|---|
| 4,159,493 | 6/1979 | Ohta et al. | 360/121 |
| 4,539,615 | 9/1985 | Arai et al. | 360/121 |
| 4,677,036 | 6/1987 | Nakamura et al. | 360/126 |
| 4,797,767 | 1/1989 | Baus, Jr. | 360/121 |
| 4,862,304 | 8/1989 | Yunoki et al. | 360/121 |

FOREIGN PATENT DOCUMENTS

| | | | |
|---|---|---|---|
| 58-14312 | 1/1983 | Japan | 360/121 |
| 58-222417 | 12/1983 | Japan | 360/121 |
| 63-108511 | 5/1988 | Japan | 360/121 |

OTHER PUBLICATIONS

Nortronics Design Digest for Digital Magnetic Recording; form No. 9212; 1971; pp. 1-33.

*Primary Examiner*—Carl E. Hall
*Attorney, Agent, or Firm*—Cohen, Pontani, Lieberman & Pavane

[57] ABSTRACT

A thin film magnetic head includes first and second head chips, each of the head chips having a substrate, a reproducing head portion provided in a side edge portion on the substrate, and a protecting plate convering the reproducing head portion and the recording head portion. The reproducing head portion and the recording head portion are formed of a lower magentic layer, an electroconductive coil layer, an upper magnetic layer and insulation layers interposed therebetween, deposited in stacked relation on the substrate one after another. The first and second head chips are arranged in side-by-side relation and are inverted with respect to each other so that the recording head portion in the first head chip and the reproducing head portion in the second head chip form a recording/reproducing head portion for a first traveling direction of a magnetic recording medium, and the reprducing head portion in the first head chip and the recording head portion in the second head chip form a recording/reproducing head portion for a second or reverse traveling direction of the recording medium.

5 Claims, 6 Drawing Sheets

METHOD OF FORMING A MAGNETIC HEAD CHIP FOR A THIN FILM MAGNETIC HEAD

CROSS REFERENCE TO RELATED APPLICATION

This is a division of copending U.S. application Ser. No. 07/368,265, filed Jun. 19, 1989, now U.S. Pat. No. 5,068,760 dated Nov. 26, 1991.

FIELD OF THE INVENTION

The present invention relates to a thin film magnetic head and, more particularly, it relates to a thin film magnetic head employed in a magnetic recording/reproducing apparatus which feeds a magnetic tape in the forward and reverse directions to record and reproduce information in a bidirectional manner.

BACKGROUND OF THE INVENTION

A magnetic head in a magnetic tape recording/reproducing apparatus (hereinafter referred to as a streamer) which is used for backing up a hard disk must be provided with the capability of reading-after-writing. Therefore, such a magnetic head has a recording/reproducing head comprising both a recording head and a reproducing head. The recording head is positioned before the reproducing head relative to the tape travel direction. The reproducing head is positioned after the recording head for record checking and reproducing the recorded data.

In such a streamer, a reciprocative recording/reproducing method called the serial-serpentine method is usually applied in order to record and reproduce successively, or without interruption, on a plurality of tracks. The method requires two of the recording/reproducing heads disposed as stated above. These recording/reproducing heads are placed in an inverted arrangement to each other relative to the magnetic tape traveling direction, so that the two magnetic heads are alternately used between forward and reverse traveling of the tape. When the tape has traveled in both directions, the magnetic heads are shifted relative to the tape by a distance corresponding to the track pitch to record/reproduce the next track.

As the capacity of magnetic recording/reproducing apparatus has increased in recent years, an attempt to simultaneously reproduce a plurality of tracks has been made so as to enhance the data transfer rate in such a streamer. For that purpose, a thin film magnetic head which is easily multi-channeled is suitable (see U.S. Pat. No. 4,677,036).

FIG. 9 shows a prior art thin film magnetic head of the serial-serpentine type. The thin film magnetic head includes three head chips 11, 12 and 13. The head chip 12 in the middle is provided with two reproducing head portions 14, 15 which are disposed at a spacing or distance corresponding to the track pitch multiplied by an integer. On the other hand, the adjacent head chips 11, 13 are provided with recording head portions 17, 16, respectively. The recording head portion 16 and the reproducing head portion 14 are mated to one recording/reproducing head portion while the recording head portion 17 and the reproducing head portion 15 are mated to another recording/reproducing head portion. In this way, the head portions 16, 14 carry out the recording/reproducing operations when a tape 18 is moved in the direction of arrow A while the head portions 17, 15 do so when the tape 18 is moved in the direction of arrow B.

FIG. 10 shows another prior art thin film magnetic head. The thin film magnetic head of FIG. 10 includes a head chip 22 in the middle having recording head portions 24, 25 and adjacent head chips 21, 23 having respective reproducing head portions 27, 26. In this second magnetic head, the head portions 24, 26 carry out the recording/reproducing operations when the tape 18 is moved in the B direction while the head portions 25, 27 do so when tape 18 is moved in the A direction.

Thus, in a conventional thin film magnetic head chip, especially the head chip 12 (22) disposed in the middle, the same type of head portions are formed on one substrate; that is, either the reproducing head portions alone or the recording head portions alone are located on one substrate. Hence, where the head chip 12 (22) is employed in a thin film magnetic head of the serial-serpentine type, the head chips 11, 13 (21,23) must be provided in parallel relation adjacent to the head chip 12 (22), as described above.

However, when the thin film magnetic head is formed of the three head chips 11 to 13 (21 to 23) disposed in parallel relation to each other, it is very difficult to appropriately position the head chips 11 to 13 (21 to 23) relative to each other and to keep each head chip and the magnetic tape 18 in an appropriate relative position, resulting in a likelihood of data loss due to azimuth error or positional deviation from the recording tracks. Since such losses increase as the track width or the recording wavelength is decreased, more accurate positioning of the thin film magnetic head may be required. In addition, high accuracy is required to move the tape in a stable manner on and in contact with the head chips 11 to 13 to any relative positioning in an effort to minimize magnetic flux leakage in the space between each head chip and the magnetic tape 18.

SUMMARY OF THE INVENTION

Accordingly, it is an object of the present invention to provide a thin film magnetic head comprising first and second head chips, each of the head chips providing a substrate, a reproducing head portion and a recording head portion provided in a side edge portion on the substrate, and a protecting plate covering the reproducing head portion and the recording head portion; the reproducing head portion and the recording head portion having a lower magnetic layer, an electroconductive coil layer, an upper magnetic layer and insulation layers interposed therebetween, which are deposited on the substrate one after another, the recording head portion in the first head chip and the reproducing head portion in the second head chip being positionally related or mated with a first recording/reproducing head portion, the reproducing head portion in the first head chip and the recording head portion in the second head chip being positionally related or mated with a second recording/reproducing head portion, the first and second recording/reproducing head portions being positioned in an inverted arrangement relative to each other and to the traveling direction of a magnetic recording medium.

In a thin film magnetic head according to the present invention, a reproducing head portion and a recording head portion are disposed at a certain relative spacing or distance on the same substrate.

Thus, a thin film magnetic head of the serial-serpentine type which has a simple structure is provided. A tape can be easily maintained in an appropriate position relative to each of the head chips so that data loss due to azimuth error or deviation from the recording tracks can be avoided.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

An embodiment of the present invention will now be described in conjunction with the accompanying drawings.

Figure 1:
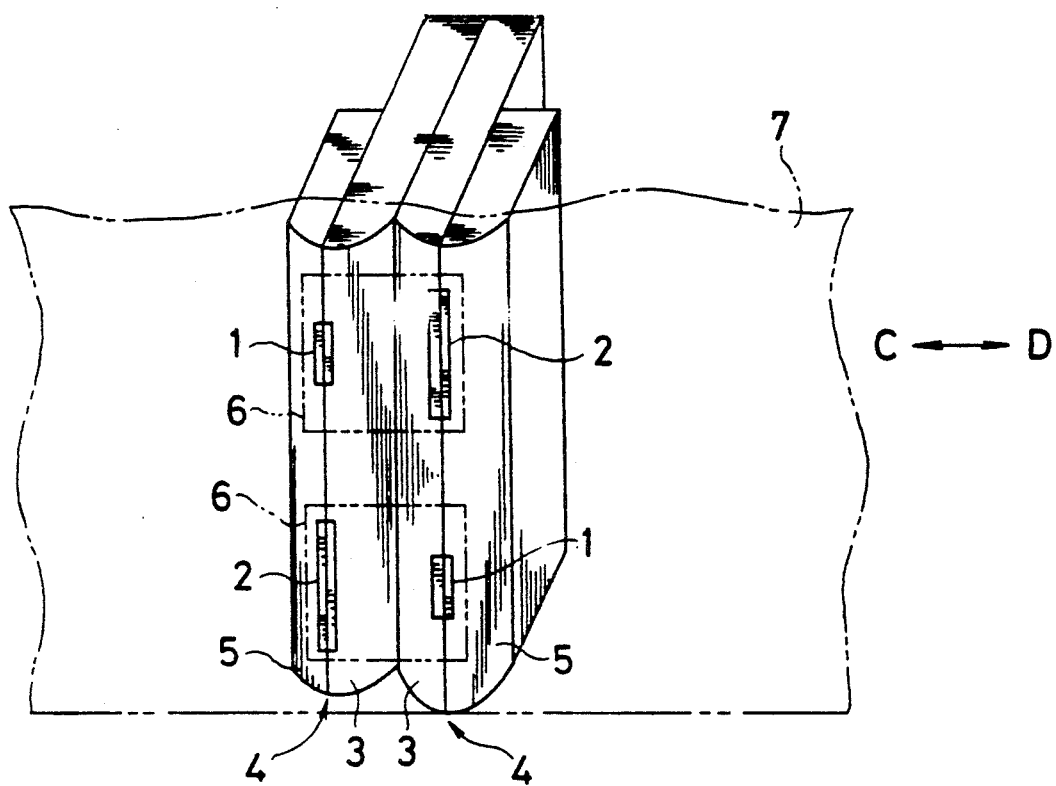
FIG. 1 is a perspective view showing an embodiment of a thin film magnetic head of the present invention.
Figure 2:
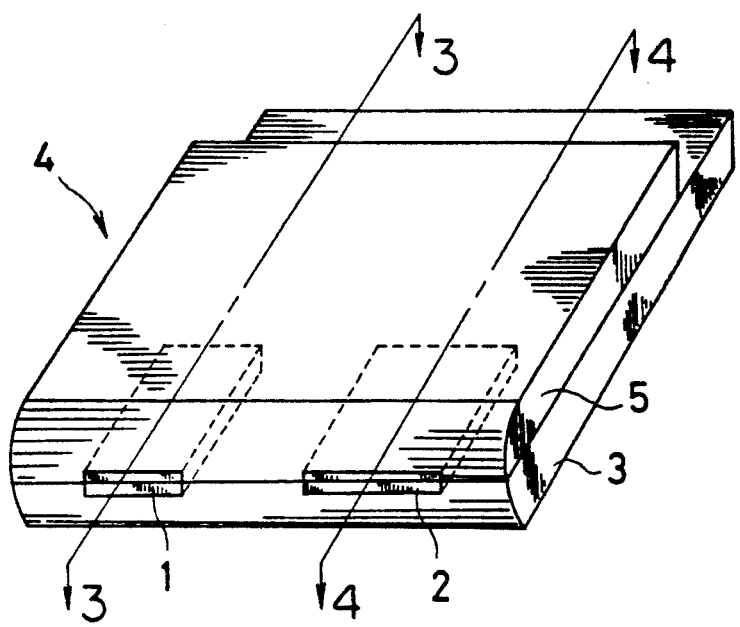
FIG. 2 is an elevated perspective view showing a thin film magnetic head chip of the magnetic head shown in FIG. 1.

As shown in FIG. 1, a thin film magnetic head of the serial-serpentine type includes two thin film magnetic head chips 4. Each of the head chips 4 has a reproducing head portion 1 and recording head portion 2 disposed on the same substrate 3 at a relative spacing or distance from each other corresponding to the track pitch of a magnetic tape 7 multiplied by an integer, and a head protecting plate 5 protectively covering the head portions 1, 2. The reproducing head portion 1 and recording head portion 2 are formed of a lower magnetic film, a coil conductor, an upper magnetic film and insulation layers interposed therebetween, as will be described hereinbelow.

In the above mentioned thin film magnetic head, a pair of recording/reproducing head portions or regions 6 are defined. The recording head portion 2 in one of the head chips 4 and the reproducing head portion 1 in the other head chip are mated or positionally related or aligned to form one of the recording/reproducing head portions 6, while the reproducing head portion 1 in the former of the head chips 4 and the recording head portion 2 in the latter head chip are mated or positionally related or aligned to form the other portion 6. Those recording/reproducing head portions 6 are positioned with their respective recording and reproducing head portions 1, 2 inverted relative to each other and with respect to the traveling direction of the magnetic tape 7. As a result, the upper recording/reproducing head portion 6 shown in FIG. 1 is used for recording/reproducing when the magnetic tape 7 is moved in the direction of arrow C, and the lower recording/reproducing head portion 6 is so used when the magnetic tape 7 is moved in the direction of arrow D.

Thus, according to the present invention, a thin film magnetic head of the serial-serpentine type is provided having two thin film magnetic head chips 4 disposed in parallel relation. Such a thin film magnetic head having two head chips has a simple structure and, therefore, its manufacturing process may be simplified as compared to a conventional thin film magnetic head having three head chips. Additionally, the tape 7 can be easily maintained in an appropriate position relative to each of the head chips 4 so that data loss due to azimuth error or deviation from recording tracks can be avoided. The tape 7 can also be moved above each head chip 4 and in contact with the same in a stable manner so as to minimize and reduce magnetic flux leakage.

The above mentioned reproducing head portion 1 and recording head portion 2 utilize electromagnetic induction caused by an electroconductive coil layer to perform the reproducing and recording functions, respectively. The characteristics required of a recording head and of a reproducing head are different. Usually, the reproducing head and the recording head are different in configuration and thickness of a lower magnetic film and of an upper magnetic film, the length of the gap and the width of the track so as to exhibit the required characteristics in an optimum manner. However, it is not desirable to separately form the reproducing head portion 1 and the recording head portion 2 on the same substrate 3 with different processes because the manufacturing steps are then doubled. Thus, the reproducing head portion 1 and the recording head portion 2 are simultaneously formed on the same substrate 3.

In forming the lower magnetic films on the substrate 3, for example, the lower magnetic film in the recording head portion 2 must be thicker than that of the reproducing head portion 1 in the light of the recording capability of the recording head portion 2 and the reproducing resolution of the reproducing head portion 1. The process to form these lower magnetic films with different relative thickness comprises the sequential steps of depositing a magnetic film of Fe-Al-Si, Ni-Fe or the like in the reproducing head portion 1 and recording head portion 2 in the thickness corresponding to the desired difference in thickness therebetween, removing a prescribed part of the magnetic film in the reproducing head portion 1, depositing magnetic film of Fe-Al-Si, Ni-Fe or the like in the required thickness in the reproducing head portion 1 and recording head portion 2, and patterning the magnetic film into a desired configuration in the reproducing head portion 1 and recording head portion 2. In this way, a lower magnetic film of desired configuration and thickness can be provided in each of the reproducing head portion 1 and the recording head portion 2.

Usually, the gap of the recording head portion 2 is made larger than that of the reproducing head portion 1 in the light of the recording capability of the recording head portion 2 and the reproducing resolution of the reproducing head portion 1. The gaps are also formed in the same way as in the formation of the above mentioned lower magnetic films. The process accordingly comprises the steps of depositing a thin film of $SiO_2$, $Al_2O_3$ or the like in the reproducing head portion 1 and recording head portion 2 in the thickness corresponding to the desired difference in thickness therebetween, removing the thin film in a pre-gap portion of the reproducing head portion 1 by etching, depositing thin films SiO$_2$, Al$_2$O$_3$ or the like in the required thickness in the reproducing head portion 1 and the recording head portion 2, and patterning the thin film into a desired configuration in the reproducing head portion 1 and in the recording head portion 2. In this way, a gap of the desired length can be provided in each of the reproducing head portion 1 and the recording head portion 2.

Similarly, with regard to the configuration and thickness of the upper magnetic film and the thickness of the electroconductive coil layer, the desired formation can be attained by the same process as is described above. The difference viewable in a plan view as, for example, the width difference of tracks, can be easily formed through the use of a photomask having slits in accord with that difference.

Figure 3:
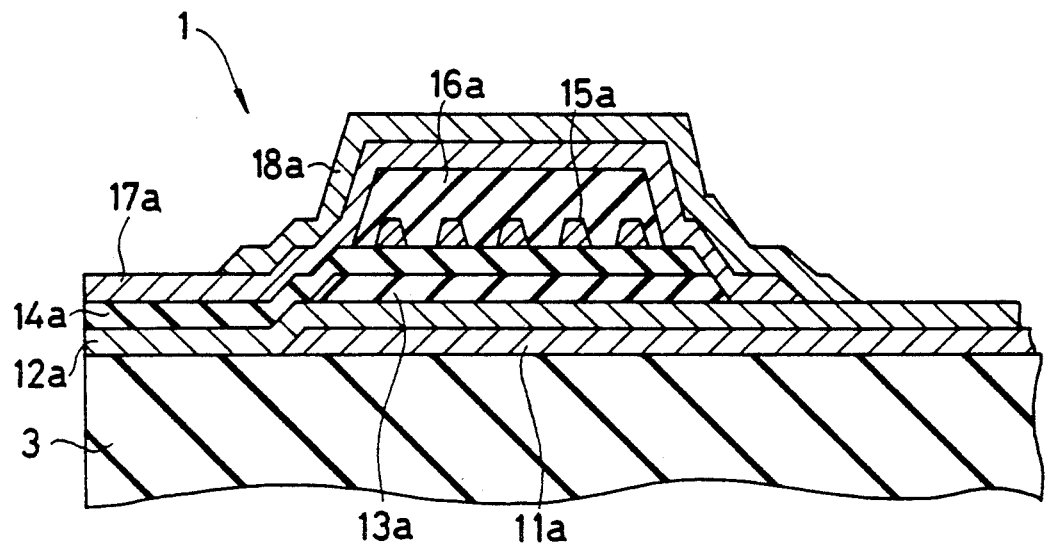
FIGS. 3 and 4 are sectional views taken along the lines 3—3 and 4—4, respectively, in FIG. 2.
Figure 4:
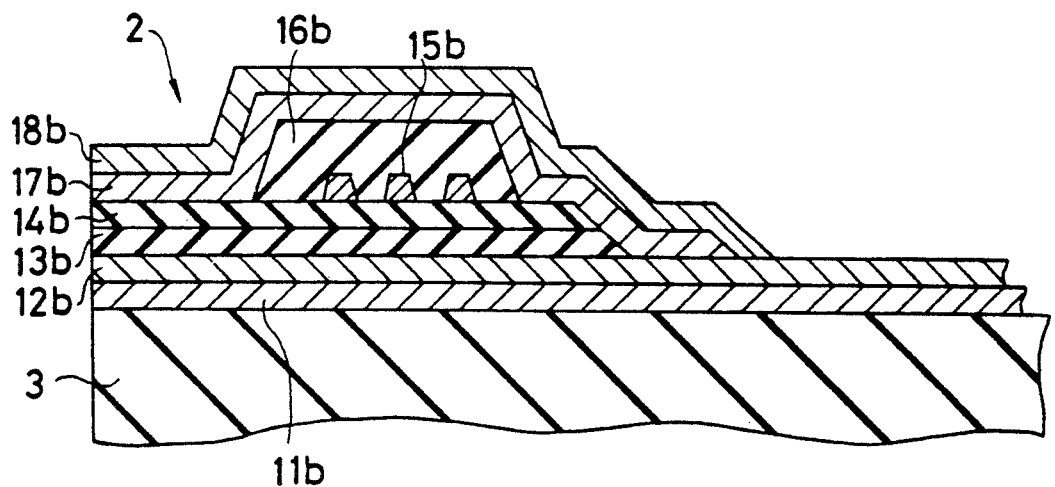

FIGS. 3 and 4 are sectional views of a magnetic head chip taken along the lines 3—3 and 4—4, respectively, in FIG. 1 with the protecting plate 5 omitted. In these figures, the reference numerals 11a, 11b designate first lower magnetic films; numerals 12a, 12b second lower magnetic films; numerals 13a, 13b first gap layers; numerals 14a, 14b second gap layers; numerals 15a, 15b electroconductive coil layers; numerals 16a, 16b insulation layers; 17a, 17b first upper magnetic film; and numerals 18a, 18b second upper magnetic films.

Figure 5:
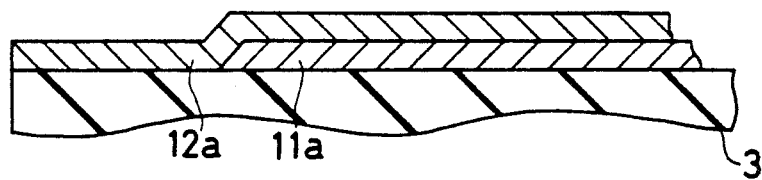
FIGS. 5 and 6 are views showing manufacturing steps for the thin film magnetic head chip in FIG. 2.
Figure 5:
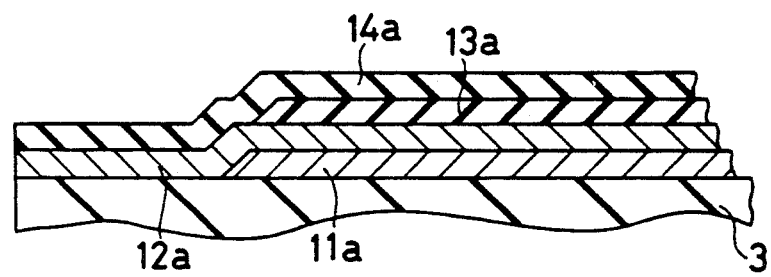
Figure 5:
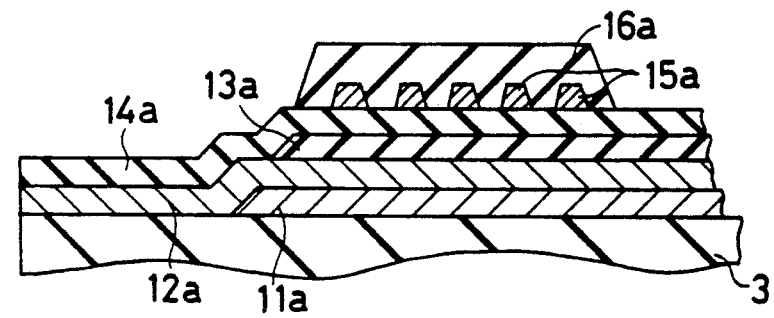
Figure 5:
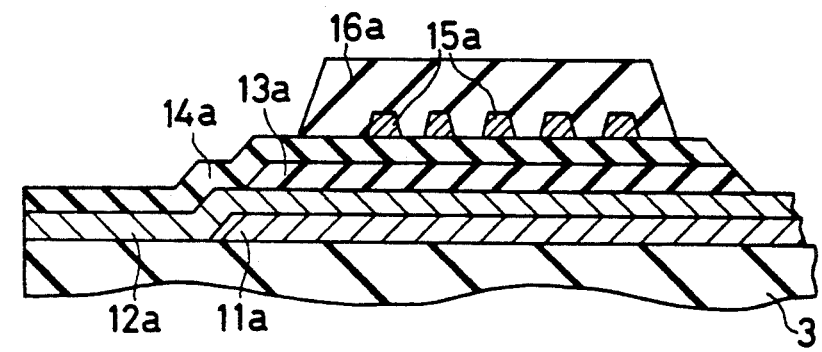
Figure 6:
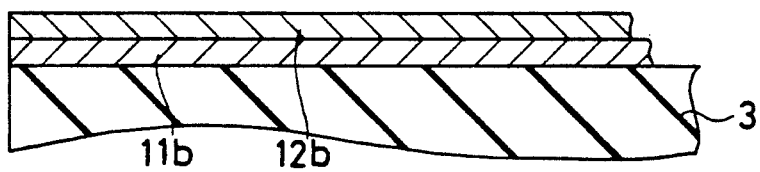
Figure 6:
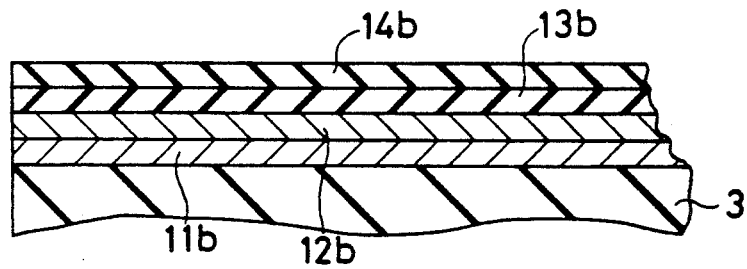
Figure 6:
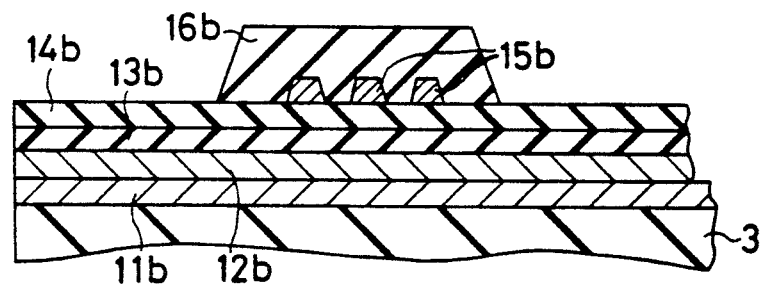
Figure 6:
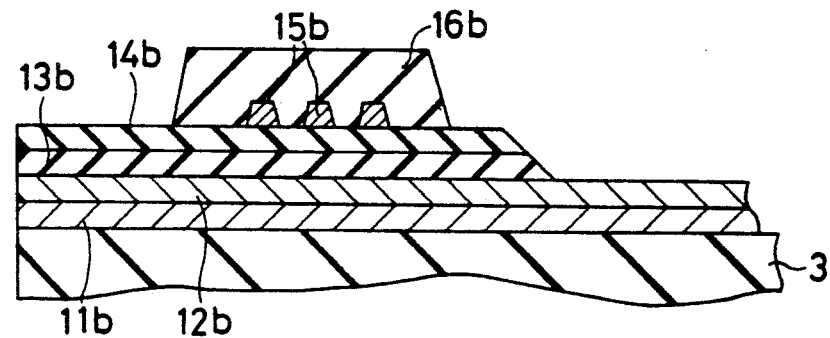
Figure 7:
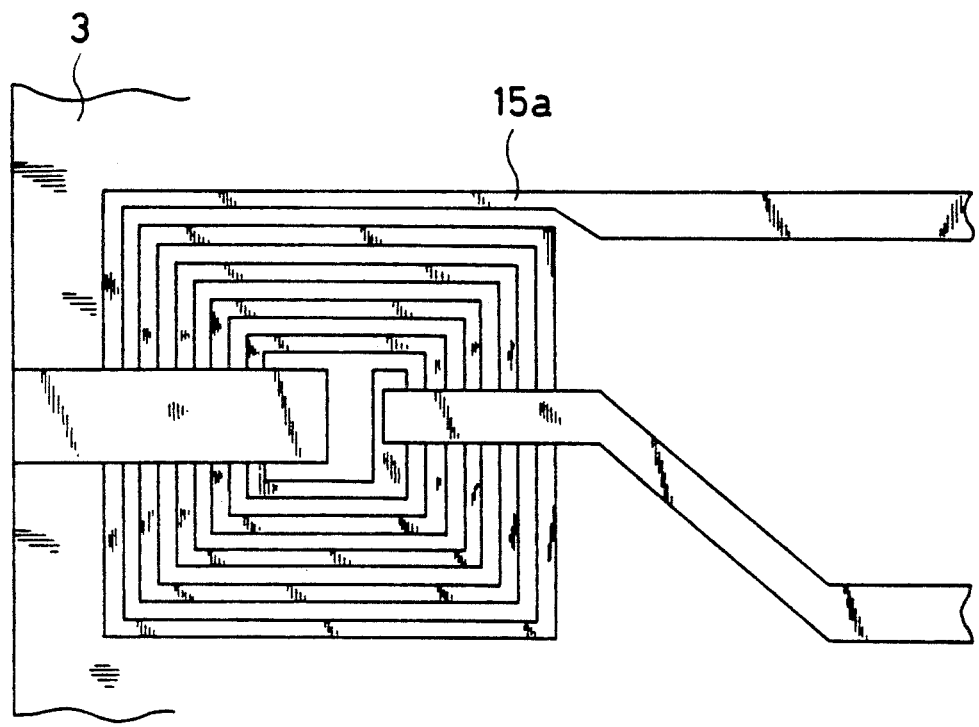
FIG. 7 is a top plan view of the head chip of FIG. 3.

FIGS. 5 and 6 are sectional views illustrating the steps of manufacturing the reproducing head portion 1 and the recording head portion 2, respectively. Referring to FIGS. 5(a) and 6(a), a magnetic thin film of an amorphous material including Ni-Fe, Fe-Al-Si or Co is deposited on an Al$_2$O$_3$ sintered substrate, an Mn-Zn ferrite substrate, an Ni-Z ferrite substrate or a glass-ceramics substrate (3) by sputtering or electron beam vapor deposition. The magnetic thin film is etched into a predetermined configuration by means of wet-etching or ion-beam etching so that the lower magnetic films 11a, 11b are simultaneously formed. Then, the second lower magnetic films 12a, 12b are simultaneously formed similar to the lower magnetic films 11a, 11b. As can be seen in FIGS. 5(b) and 6(b), a thin film of SiO$_2$, Al$_2$O$_3$ or SiN$_4$ is deposited by means of plasma-CVD, sputtering or electron beam deposition. The thin film is etched into a predetermined configuration so that the first gap layers 13a, 13b are simultaneously formed. Then, the second gap layers 14a, 14b are simultaneously deposited of the same material and in the same way as the first gap layers 13a, 13b. Referring to FIGS. 5(c) and 6(c), a conductor layer Au, Al or Ag is deposited by means of electron beam deposition or sputtering. The conductor layer is etched into a coil so that the electroconductive coil layers 15a, 15b are simultaneously formed. Then, the insulation layers 16a, 16b are simultaneously deposited on the same material and in the same way as the first gap layers 13a, 13b. Further, as shown in FIGS. 5(d) and 6(d), the first gap layers 13a, 13b and the second gap layers 14a, 14b are etched into a predetermined configuration by means of wet-etching or ion-beam etching. Then, as shown in FIGS. 3 and 4, the first upper magnetic films 17a, 17b and the second upper magnetic films 18a, 18b are deposited one after another of the same material and in the same way as the first lower magnetic films 11a, 11b. FIG. 7 is a top plan view of FIG. 3 showing the planar configuration of the electroconductive coil layer.

The head protecting plate 5 is attached to the substrate 3 which has been provided with the magnetic films and electroconductive coil layer. After that, the substrate 3 is grounded and polished at the surface along which the recording medium slidably travels, and the head chip 4 is thus obtained. The head chips 4 are disposed in parallel relation with the reproducing head portions 1 and recording head portions 2 being positioned in an appropriate relation. The thin film magnetic head is accordingly formed.

Figure 8:
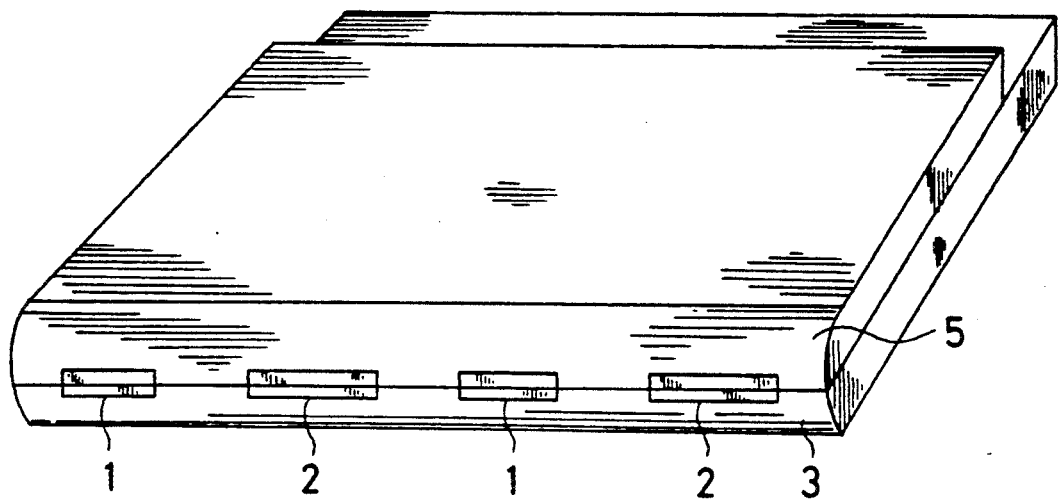
FIG. 8 is an elevated perspective view showing a plurality of reproducing heads and recording heads formed on the same substrate.
Figure 9:
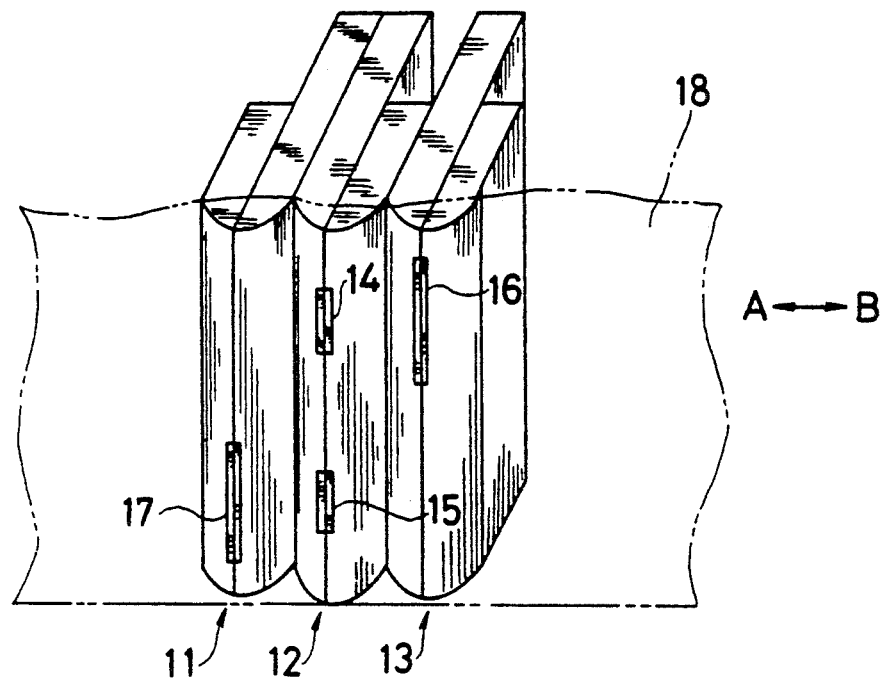
FIGS. 9 and 10 are perspective views showing prior art thin film magnetic heads of the serial-serpentine type, formed of thin film magnetic head chips.
Figure 10:
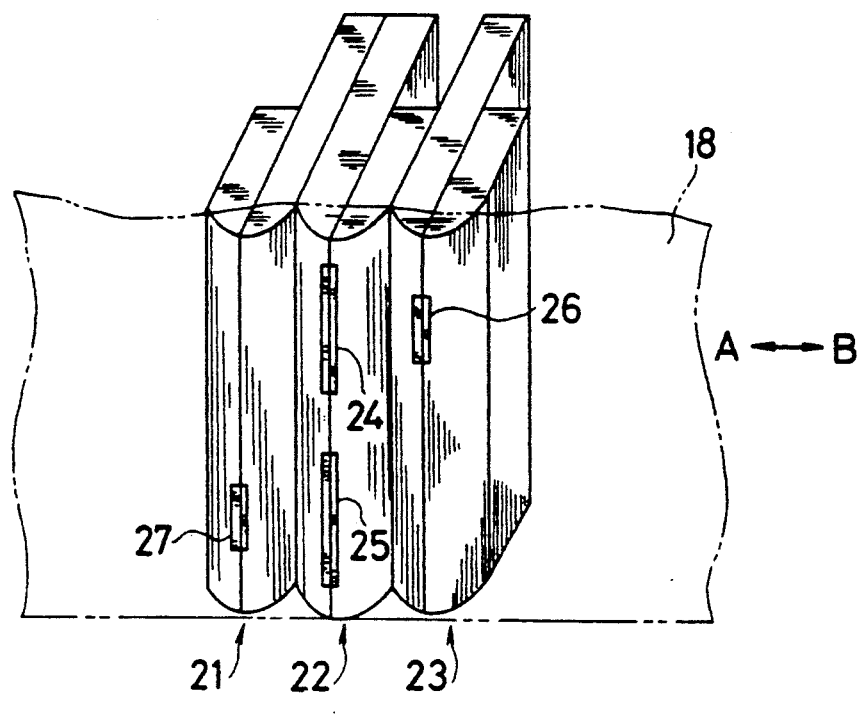

In the thin film magnetic head, as shown in FIG. 8, a plurality of reproducing head portions 1 and a plurality of recording head portions 2 may be alternately positioned and aligned so as to enable simultaneous recording/reproducing of more than one track.

As has been described, the thin film magnetic head according to the present invention includes a substrate, a lower magnetic film, an electroconductive coil layer, an upper magnetic film and insulation layers interposed therebetween, all of which are formed in stacked relation on the substrate. In this thin film magnetic head, the reproducing head portion and the recording head portion are disposed at a certain relative spacing or distance on the same substrate.

Thus, in accordance with the present invention a thin film magnetic head of the serial-serpentine type which has a simple structure and has, therefore, a simplified manufacturing process is provided. Additionally, a tape can be easily maintained in appropriate position relative to each of the head chips so that data loss due to azimuth error or deviation from the recording tracks can be avoided. The tape can also be moved along each head chip and in contact with the same in a stable manner as to minimize and reduce magnetic flux leakage.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, however, therefore, to be limited only as indicated by the scope of the claims appended hereto.

What is claimed is:

1. A method of forming a head chip for a thin film magnetic head operative for recording and reproducing information on an elongated magnetic recording medium that is longitudinally movable past the magnetic head, the head chip including thereon both a recording head portion and a reproducing head portion, each of the recording and reproducing head portions being formed of a lower magnetic layer, a first insulating layer, an electroconductive coil layer, a second insulating layer and an upper magnetic layer, and wherein at least the lower and upper magnetic layers are thicker at the location of the recording head portion than at the location of the reproducing head portion of the head chip, said method comprising the steps of:

laying down, on a substrate, a first lower magnetic film layer;

laying down, on the first lower magnetic film layer, a second lower magnetic film layer;

stripping away at least a portion of the second lower magnetic film layer at the location of the reproducing head portion so that the lower magnetic layer defined by the first and second lower magnetic film layers is thinner at the location of the reproducing head portion than at the location of the recording head portion;

laying down, on the lower magnetic layer, a first insulating layer;

laying down, on the first insulating layer, an electroconductive coil layer;

laying down, over the electroconductive coil layer, a second insulating layer;

laying down, on the second insulating layer, a first upper magnetic film layer;

laying down, on the first upper magnetic film layer, a second upper magnetic film layer; and stripping away at least a portion of the second upper magnetic film layer at the location of the reproducing head portion so that the upper magnetic layer defined by the first and second upper magnetic film layers is thinner at the location of the reproducing head portion than at the location of the recording head portion.

2. A method of forming a head chip in accordance with claim 1, wherein said step of laying down the first insulating layer comprises the steps of:

laying down a first insulating film layer on the lower magnetic layer;

laying down a second insulating film layer on the first insulating film layer; and stripping away at least a portion of the second insulating film layer at the location of the reproducing head portion so that the first insulating layer defined by the first and second insulating film layers is thinner at the location of the reproducing head portion than at the location of the recording head portion.

3. A method of forming a head chip in accordance with claim 1, wherein said step of laying down the second insulating layer comprises the steps of:

laying down a first insulating film layer on the upper magnetic layer;

laying down a second insulating film layer on the second insulating film layer; and stripping away at least a portion of the second insulating film layer at the location of the reproducing head portion so that the second insulating layer defined by the first and second insulating film layers is thinner at the location of the reproducing head portion than at the location of the recording head poriton.

4. A method of forming a head chip in accordance with claim 2, wherein said step of laying down the second insulating layer comprises the steps of:

laying down a third insulating film layer on the upper magnetic layer;

laying down a fourth insulating film layer on the second insulating film layer; and stripping away at least a portion of the fourth insulating film layer at the location of the reproducing head portion so that the second insulating layer defined by the third and fourth insulating film layers is thinner at the location of the reproducing head poriton than at the location of the recording head portion.

5. A method of forming a head chip in accordance with claim 1, wherein said steps of stripping away at least a portion of the second lower and upper magnetic film layers comprises etching the second film layers so as to remove at least a portion of the second film layers at the location of the reproducing head portion.

* * * * *